United States Patent [19]

Beckmann et al.

[11] Patent Number: 5,549,853

[45] Date of Patent: Aug. 27, 1996

[54] LINKED AZO DYES

[75] Inventors: Stefan Beckmann, Mannheim; Karl-Heinz Etzbach; Karl Siemensmeyer, both of Frankenthal; Ruediger Sens, Mannheim, all of Germany

[73] Assignee: BASF Aktiengesellschaft, Ludwigshafen, Germany

[21] Appl. No.: 254,789

[22] Filed: Jun. 6, 1994

[30] Foreign Application Priority Data

Jun. 25, 1993 [DE] Germany ............ 43 21 166.6

[51] Int. Cl.⁶ .................. F21V 9/00; G02F 1/00
[52] U.S. Cl. .............. 252/582; 359/321; 534/726; 534/805; 534/806; 534/810; 534/829
[58] Field of Search ............... 534/726, 805, 534/806, 810, 829; 252/582; 359/321

[56] References Cited

U.S. PATENT DOCUMENTS

| | | | |
|---|---|---|---|
| 3,211,717 | 10/1965 | Thomas et al. | 534/810 X |
| 3,642,764 | 2/1972 | Montmollin et al. | 534/8065 X |
| 3,691,148 | 9/1972 | Peter et al. | 534/608 |
| 3,895,004 | 7/1975 | de Montmollin et al. | 534/642 |
| 3,912,712 | 10/1975 | Peter et al. | 534/614 |
| 4,739,042 | 4/1988 | Lorenz et al. | 534/649 |
| 4,843,153 | 6/1989 | Eilingsfeld et al. | 534/752 |
| 5,186,865 | 2/1993 | Wu et al. | 534/653 X |
| 5,212,250 | 5/1983 | McCulloch et al. | 525/276 |
| 5,321,084 | 6/1994 | Cross et al. | 525/107 |
| 5,384,378 | 1/1995 | Etzbach et al. | 526/256 |
| 5,401,612 | 3/1995 | Etzbach et al. | 430/285 |

FOREIGN PATENT DOCUMENTS

| | | |
|---|---|---|
| 0201896 | 11/1986 | European Pat. Off. . |
| 0211326 | 2/1987 | European Pat. Off. . |
| 0535590 | 4/1993 | European Pat. Off. . |
| 0544153 | 6/1993 | European Pat. Off. . |
| 1551378 | 12/1968 | France . |
| 1577114 | 6/1969 | France . |
| 3108077 | 1/1982 | Germany . |
| 1546803 | 5/1979 | United Kingdom . |

OTHER PUBLICATIONS

Academic Press, vol. III, K. Venkataraman, "The Chemistry Of Synthetic Dyes", pp. 423–447, 1970.

Chemistry & Industry, Carole Jones, "Polymers For Non-Linear Optical Devices", pp. 600–608, Oct. 1, 1990.

Primary Examiner—Fiona T. Powers
Attorney, Agent, or Firm—Olbon, Spivak, McClelland, Maier & Neustadt, P.C.

[57] ABSTRACT

Azo dyes of the formula

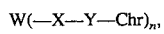

where
  n is 2 to 6,
  y is $C_1$–$C_6$-alkylene,
  Chr is the radical of a mono- or polyazo dye,
  X is a radical of the formula CO—O or O—CO and
  W is an n-valent radical which is derived from an unsubstituted or substituted $C_2$–$C_{20}$-alkane, an unsubstituted or substituted $C_4$–$C_7$-cycloalkane, an unsubstituted or substituted benzene or an unsubstituted or substituted naphthalene, or, if n is 4, is also silicon,
and their use in nonlinear optics or for dyeing or printing textile materials are described.

3 Claims, No Drawings

LINKED AZO DYES

The present invention relates to novel azo dyes of the formula

$$W(-X-Y-Chr)_n \quad (I),$$

where n is 2 to 6,

Y is $C_1$–$C_6$-alkylene,

Chr is a radical which is derived from a mono- or polyazo dye and which is bonded to the radical Y via a chemical bond, CO-O, oxygen, sulfur, imino or $C_1$–$C_4$-alkylimino, X is a radical of the formula CO—O or O—CO and W is an n-valent radical which is derived from an unsubstituted or substituted $C_2$–$C_{20}$-alkane, an unsubstituted or substituted $C_4$–$C_7$-cycloalkane, an unsubstituted or substituted benzene or an unsubstituted or substituted naphthalene, or, if n is 4, is also silicon, and to their use in nonlinear optics or for dyeing or printing textile materials.

The organic materials at present used in nonlinear optics are as a rule based on functionalized polymers. In general, these are prepared from corresponding low molecular weight precursors by free-radical polymerization or polycondensations or alternatively by polymer-like reactions. In order to achieve the necessary long-term stability in the polarized states, either a high glass transition temperature or a crosslinking step is necessary.

A disadvantage of all the previously used materials is the relatively poor reproducibility of the polymers. This results in many process parameters, e.g. polarization temperature or polarization voltage, having to be varied in the production of apparatus for nonlinear optics as a function of the charge of the polymers used in each case.

It is an object of the present invention to provide novel azo dyes which, on the one hand, can be prepared reproducibly and, on the other hand, have a high long-term stability and are thus advantageously useful in the field of nonlinear optics or alternatively in dyeing or printing textile materials.

We have found that this object is achieved by the azo dyes of the formula I described in greater detail at the beginning.

All alkyl and alkylene groups occurring in the abovementioned formula can be either straight-chain or branched.

If, in the abovementioned formula, substituted phenyl or naphthalene groups occur, suitable substituents can be e.g. $C_1$–$C_4$-alkyl, $C_1$–$C_4$-alkoxycarbonyl, $C_3$–$C_4$-alkenyloxycarbonyl, carboxyl, chlorine, bromine, nitro or $C_1$–$C_4$-alkoxy. The phenyl radicals in this case as a rule have 1 to 3 identical or different substituents.

If substituted cycloalkyl groups occur in the abovementioned formula, suitable substituents can be e.g. $C_1$–$C_4$-alkyl.

If substituted alkyl groups occur in the abovementioned formula, suitable substituents can be e.g. hydroxyl.

Y radicals are e.g. $CH_2$, $(CH_2)_2$, $(CH_2)_3$, $(CH_2)_4$, $(CH_2)_5$, $(CH_2)_6$, $CH(CH_3)CH_2$ or $CH(CH_3)CH(CH_3)$.

$C_1$–$C_4$-alkylimino is e.g. methylimino, ethylimino, propylimino, isopropylimino, butylimino, isobutylimino or sec-butylimino.

Suitable $W(-COOH)_n$ or their ester compounds (X=CO—O) or $W(-OH)_n$ (X=O—CO) compounds, on which the azo dyes according to the invention are based, are e.g. aliphatic alcohols, such as ethane-1,2-diol, glycerol, butane-1,2,4-triol, 2-methyl-2-hydroxymethylpropane-1,3-diol, 2-ethyl-2-hydroxymethylpropane-1,3-diol, butane-1,2,3,4-tetraol, pentaerythritol, xylitol, mannitol or sorbitol, aliphatic carboxylic acids, such as propane-1,2,3-tricarboxylic acid, butane-1,1,4-tricarboxylic acid, butane-1,2,3,4-tetracarboxylic acid, citric acid or 2-hydroxynonadecyl-1,2,3-tricarboxylic acid, cycloaliphatic alcohols having 5 or 6 ring members, such as 1,2,3,4-tetrahydroxycyclopentane, 1,2,3-trihydroxycyclohexane, 1,2,4-trihydroxycyclohexane, 1,3,5-trihydroxycyclohexane, 1,2,3,4-tetrahydroxycyclohexane, 1,2,3,5-tetrahydroxycyclohexane, 1,2,4,5-tetrahydroxycyclohexane, 1,2,3,4,5-pentahydroxycyclohexane or 1,2,3,4,5,6-hexahydroxycyclohexane, cycloaliphatic carboxylic acids having 5 or 6 ring members, such as cyclopentane-1,2,3-tricarboxylic acid, cyclopentane-1,2,4-tricarboxylic acid, 2-methylcyclopentane-1,2,3-tricarboxylic acid, 3-methylcyclopentane-1,2,4-tricarboxylic acid, cyclopentane-1,1,2,2-tetracarboxylic acid, cyclopentane-1,2,2,4-tetracarboxylic acid, cyclopentane-1,1,3,3-tetracarboxylic acid, cyclopentane-1,2,3,4-tetracarboxylic acid, cyclopentane-1,2,3,4,5-pentacarboxylic acid, cyclohexane-1,1,4-tricarboxylic acid, cyclohexane-1,2,4-tricarboxylic acid, cyclohexane-1,3,5-tricarboxylic acid, cyclohexane-1,1,3,3-tetracarboxylic acid, cyclohexane-1,1,4,4-tetracarboxylic acid, cyclohexane-1,2,3,4-tetracarboxylic acid, cyclohexane-1,2,4,5-tetracarboxylic acid, cyclohexane-1,1,3,3,5-pentacarboxylic acid or cyclohexane-1,2,3,4,5,6-hexacarboxylic acid, or benzene or naphthalene derivatives, such as 1,2-dihydroxybenzene, 1,3-dihydroxybenzene, 1,4-dihydroxybenzene, 1,2,3-trihydroxybenzene, 1,2,4-trihydroxybenzene, 1,3,5-trihydroxybenzene, 1,2,3,4-tetrahydroxybenzene, 1,2,3,5-tetrahydroxybenzene, 1,2,4,5-tetrahydroxybenzene and hexahydroxybenzene, phthalic acid, isophthalic acid, terephthalic acid, benzene-1,2,3-tricarboxylic acid, benzene-1,2,4-tricarboxylic acid, benzene-1,3,5-tricarboxylic acid, 3,4,5-trihydroxybenzoic acid, $C_1$–$C_4$-alkyl 3,4,5-trihydroxybenzoates, for example methyl 3,4,5-trihydroxybenzoate, 1,2,3-trihydroxytoluene, 2,4,5-trihydroxytoluene, 2,4,6-trihydroxytoluene, 3,4,5-trihydroxytoluene, pyromellitic acid, benzenepentacarboxylic acid, benzenehexacarboxylic acid, 1,2,3,4-tetrahydroxynaphthalene, naphthalene-1,8-dicarboxylic acid, naphthalene-2,6-dicarboxylic acid or naphthalene-1,4,5,8-tetracarboxylic acid.

In the case of tri-, tetra-, penta- or hexacarboxylic acids, the corresponding anhydrides can also be used.

Preferred azo dyes of the formula I are those where W is an n-valent radical which is derived from a $C_3$–$C_6$-alkane which may be substituted by hydroxyl, a cyclohexane which may be substituted by $C_1$–$C_4$-alkyl, a benzene which may be substituted by $C_1$–$C_4$-alkoxycarbonyl, $C_3$–$C_4$-alkenyloxycarbonyl or carboxyl, or from naphthalene, or, if n is 4, is also silicon.

Particularly preferred azo dyes of the formula I are those where W is an n-valent radical which is derived from glycerol, pentaerythritol, mannitol, citric acid, $C_1$–$C_4$-alkyl 3,4,5-trihydroxybenzoate or pyromellitic acid, or, if n is 4, is also silicon.

Preferred azo dyes of the formula I are those where n is 3 to 6, in particular 3 to 4.

In the radical Chr, which is derived from a mono- or polyazo dye and which is bonded to the radical Y via a chemical bond, CO—O, oxygen, sulfur, imino or $C_1$–$C_4$-alkylimino, this linkage to the radical Y can be effected either via the radical of the diazo component or via the radical of the coupling component. In the case where the linkage is effected via CO—O, oxygen, sulfur, imino or $C_1$–$C_4$-alkylimino, these members are to be regarded as belonging to the chromophore.

Preferred azo dyes of the formula I are also those in which Chr is bonded to the radical Y via the radical of the coupling component.

The radical Chr is the radical of an azo dye from the mono- or polyazo dyes class, in particular from the mono- or disazo dyes class, where monoazo dyes are particularly to be emphasized.

Suitable azo dyes, on which are based the radical Chr are known per se and described in large numbers, e.g. in K. Venkataraman "The Chemistry of Synthetic Dyes", Vol. VIII, Academic Press, New York, London, 1970.

Particularly important monoazo dyes are those having a diazo component which is derived from an aniline or from a five-membered aromatic heterocyclic amine which contains one to three hetero atoms, selected from the group consisting of nitrogen, oxygen and sulfur, in the heterocyclic ring and can be fused through a benzene, thiophene, pyridine or pyrimidine ring.

Important monoazo dyes are, for example, those whose diazo component is derived e.g. from an aniline or from a heterocyclic amine from the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzisothiazole, pyridothiophene, pyrimidothiophene, thienothiophene or thienothiazole series.

Diazo components which may particularly be mentioned are those which originate from an aniline or from a heterocyclic amine from the pyrrole, thiophene, pyrazole, thiazole, isothiazole, triazole, thiadiazole, benzothiophene, benzothiazole, benzisothiazole, pyridothiophene, pyrimidothiophene, thienothiophene or thienothiazole series.

Particularly important monoazo dyes are furthermore those having a coupling component from the aniline, aminonaphthalene, aminothiazole, diaminopyridine or hydroxypyridone series.

Particularly important monoazo dyes are those of the formula II

D—N=N—K  (II), where

D is a radical of the formula

  (IIIa)

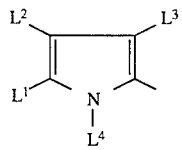  (IIIb)

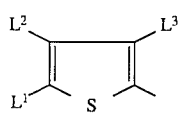  (IIIc)

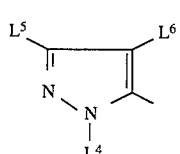  (IIId)

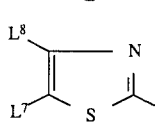

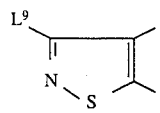  (IIIe)

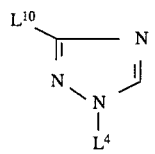  (IIIf)

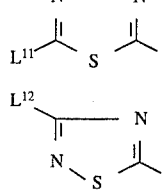  (IIIg)

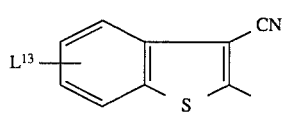  (IIIh)

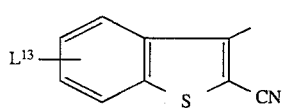  (IIIi)

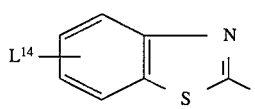  (IIIj)

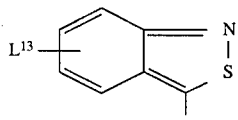  (IIIk)

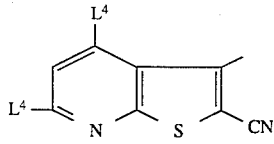  (IIIl)

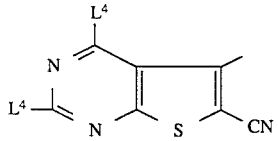  (IIIm)

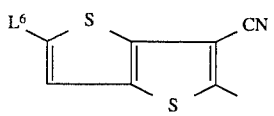  (IIIn)

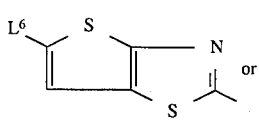  (IIIo)

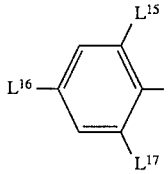  (IIIp)

(IIIq)

and is a radical of the formula

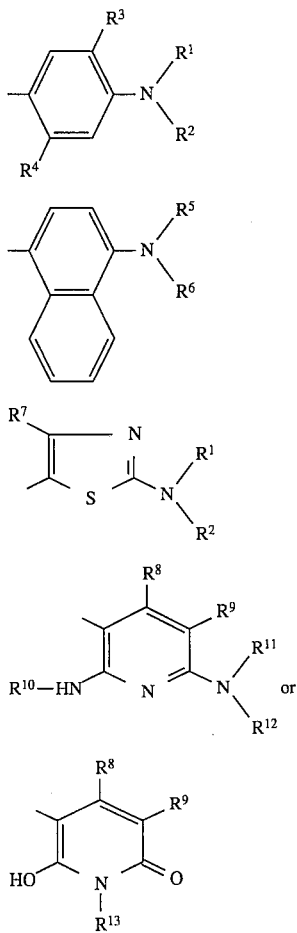

where

L¹ is nitro, cyano, $C_1$–$C_6$-alkanoyl, benzoyl, $C_1$–$C_6$-alkylsulfonyl, unsubstituted or substituted phenylsulfonyl or a radical of the formula —CH=T, where T has the meanings of hydroxyimino, $C_1$–$C_4$-alkoxyimino or a radical of a CH-acidic compound, L² is hydrogen, $C_1$–$C_6$-alkyl, halogen, hydroxyl, mercapto, $C_1$–$C_6$-alkoxy which may be substituted by phenyl or $C_1$–$C_4$-alkoxy, unsubstituted or substituted phenoxy, $C_1$–$C_6$-alkylthio which may be substituted by phenyl, unsubstituted or substituted phenylthio, $C_1$–$C_6$-alkylsulfonyl or unsubstituted or substituted phenylsulfonyl, L³ is cyano, $C_1$–$C_4$-alkoxycarbonyl, carboxyl or nitro, L⁴ is hydrogen, $C_1$–$C_6$-alkyl or phenyl, L⁵ is $C_1$–$C_6$-alkyl or phenyl, L⁶ is hydrogen, cyano, $C_1$–$C_4$-alkoxycarbonyl, carboxyl, $C_1$–$C_6$-alkanoyl, thiocyanato or halogen, L⁷ is nitro, cyano, $C_1$–$C_6$-alkanoyl, benzoyl, $C_1$–$C_4$ alkoxycarbonyl, carboxyl, $C_1$–$C_4$-alkylsulfonyl, unsubstituted or substituted phenylsulfonyl or a radical of the formula —CH=T, where T has the abovementioned meanings, L⁸ is hydrogen, $C_1$–$C_4$-alkyl, cyano, halogen, $C_1$–$C_6$-alkoxy which may be substituted by phenyl or $C_1$–$C_4$-alkoxy, $C_1$–$C_6$-alkylthio which may be substituted by phenyl, unsubstituted or substituted phenylthio, $C_1$–$C_6$-alkylsulfonyl, unsubstituted or substituted phenylsulfonyl, $C_1$–$C_4$-alkoxycarbonyl or carboxyl, L⁹ is cyano, $C_1$–$C_6$-alkyl which may be substituted by phenyl, $C_1$–$C_6$-alkylthio which may be substituted by phenyl, unsubstituted or substituted phenyl, thienyl, $C_1$–$C_4$-alkylthienyl, pyridyl or $C_1$–$C_4$-alkylpyridyl, L¹⁰ is phenyl or pyridyl, L¹¹ is trifluoromethyl, nitro, $C_1$–$C_6$-alkyl, phenyl, $C_1$–$C_6$-alkylthio which may be substituted by phenyl, or $C_1$–$C_6$-dialkylamino, L¹² is $C_1$–$C_6$-alkyl, phenyl, 2-cyanoethylthio or 2-($C_1$–$C_4$-alkoxycarbonyl)ethylthio, L¹³ is hydrogen, nitro or halogen, L¹⁴ is hydrogen, cyano, $C_1$–$C_4$-alkoxycarbonyl, carboxyl, nitro or halogen, L¹⁴, L¹⁶ and L¹⁷ are identical or different and independently of one another are in each case hydrogen, $C_1$–$C_6$-alkyl, $C_1$–$C_6$-alkoxy, halogen, nitro, cyano, $C_1$–$C_4$-alkoxycarbonyl, carboxyl, $C_1$–$C_6$-alkylsulfonyl or unsubstituted or substituted phenylsulfonyl, R¹ and R² are identical or different and independently of one another are in each case hydrogen, unsubstituted or substituted $C_1$–$C_6$-alkyl which can be interrupted by 1 or 2 ether oxygen atoms, $C_5$–$C_7$-cycloalkyl or $C_3$–$C_6$-alkenyl, R³ is hydrogen $C_1$–$C_6$-alkyl or $C_1$–$C_6$-alkoxy, R⁴ is hydrogen $C_1$–$C_4$-alkyl, $C_1$–$C_4$-alkoxy, $C_1$–$C_4$-alkylsulfonylamino, unsubstituted or substituted $C_1$–$C_6$-alkanoylamino or benzoylamino, R⁵ and R⁶ are identical or different and independently of one another are in each case hydrogen or $C_1$–$C_6$-alkyl, R⁷ is hydrogen, unsubstituted or substituted phenyl, or thienyl, R⁸ is hydrogen or $C_1$–$C_6$-alkyl, R⁹ is cyano, carbamoyl or acetyl, R¹⁰, R¹¹ and R¹² are identical or different and independently of one another are in each case unsubstituted or substituted $C_1$–$C_{12}$-alkyl which can be interrupted by 1 to 3 ether oxygen atoms, $C_5$–$C_7$-cycloalkyl, unsubstituted or substituted phenyl, $C_3$–$C_6$-alkenyl, unsubstituted or substituted benzoyl, $C_1$–$C_8$-alkanoyl, $C_1$–$C_6$-alkylsulfonyl or unsubstituted or substituted phenylsulfonyl, or R¹¹ and R¹², together with the nitrogen atom connecting them, are a 5- or 6-membered saturated heterocyclic radical which may contain further hetero atoms, and R¹³ is hydrogen or $C_1$–$C_6$-alkyl.

Particularly important diazo dyes are also those of the formula Va or Vb

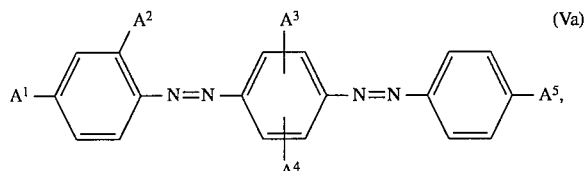

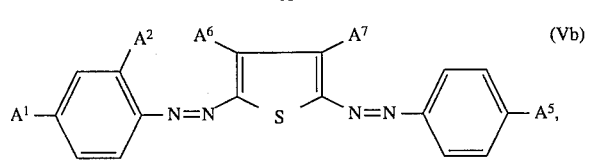

where

A¹ is hydrogen, $C_1$–$C_6$-alkyl, hydroxyl, $C_1$–$C_6$-alkoxy or nitro,

A² is hydrogen or cyano, $A^3$ and $A^4$ are identical or different and independently of one another are in each case hydrogen, $C_1$–$C_6$-alkyl or $C_1$–$C_6$-alkoxy, $A^5$ is hydrogen, hydroxyl, $C_1$–$C_4$-alkoxy, amino or $C_1$–$C_6$-mono- or dialkylamino which may be substituted by cyano, $A^6$ is hydrogen, methyl or chlorine and $A^7$ is cyano, $C_1$–$C_4$-alkoxycarbonyl or carboxyl.

All alkyl or alkenyl groups occurring in the abovementioned formulae of the azo dyes can be either straight-chain or branched.

If in the abovementioned formulae of the azo dyes substituted phenyl groups occur, suitable substituents can be e.g. $C_1$–$C_4$-alkyl, chlorine, bromine, nitro or $C_1$–$C_4$-alkoxy. The phenyl radicals in this case as a rule have 1 to 3 substituents.

If in the abovementioned formulae of the azo dyes substituted alkyl groups occur, suitable substituents can be e.g. hydroxyl, cyclohexyloxy, phenoxy, $C_1$–$C_4$-alkoxycarbonyl, $C_1$–$C_4$-alkanoyloxy, cyano, cyclohexyl or phenyl. The alkyl radicals in this case as a rule have 1 or 2 substituents.

$L^2$, $L^4$, $L^5$, $L^8$, $L^9$, $L^{11}$, $L^{12}$, $L^{15}$, $L^{16}$, $L^{17}$, $R^1$, $R^2$, $R^3$, $R^4$, $R^5$, $R^6$, $R^8$, $R^{10}$, $R^{11}$, $R^{12}$, $R^{13}$, $A^1$, $A^3$ and $A^4$ radicals are e.g. methyl, ethyl, propyl, isopropyl, butyl, isobutyl, sec-butyl, pentyl, isopentyl, neopentyl, tert-pentyl, hexyl or 2-methylpentyl.

$L^9$ radicals are furthermore e.g. benzyl or 1- or 2-phenylethyl.

$L^2$, $L^8$, $L^9$ and $L^{11}$ radicals are furthermore e.g. methylthio, ethylthio, propylthio, isopropylthio, butylthio, isobutylthio, pentylthio, hexylthio, benzylthio or 1- or 2-phenylethylthio.

$L^2$ and $L^8$ radicals are furthermore e.g. phenylthio, 2-methylphenylthio, 2-methoxyphenylthio or 2-chlorophenylthio.

$A^5$ radicals are, as furthermore are also $L^2$, $L^8$, $L^{15}$, $L^{16}$, $L^{17}$, $R^3$, $R^4$, $A^1$, $A^3$ and $A^4$ radicals, e.g. methoxy ethoxy, propoxy, isopropoxy, butoxy, isobutoxy, secbutoxy, pentyloxy, isopentyloxy, neopentyloxy, tertpentyloxy, hexyloxy or 2-methylpentyloxy.

$R^6$ radicals are, as furthermore are also $L^2$, $L^8$, $L^{13}$, $L^{14}$, $L^{15}$, $L^{16}$ and $L^{17}$ radicals, e.g. fluorine, chlorine $L^7$ radicals are, as furthermore are also $L^1$, $L^2$, $L^8$, $L^{15}$, $L^{16}$, $L^{17}$, $R^{10}$, $R^{11}$ and $R^{12}$ radicals, e.g. methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

$L^3$ and $A^7$ radicals are, as furthermore are also $L^6$, $L^7$, $L^8$, $L^{14}$, $L^{15}$, $L^{16}$ and $L^{17}$ radicals, e.g. methoxy, carbonyl, ethoxycarbonyl, propoxycarbonyl, isopropoxycarbonyl, butoxycarbonyl, isobutoxycarbonyl or secbutoxycarbonyl.

$L^2$ and $L^8$ radicals are furthermore e.g. 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

$A^5$ radicals are furthermore e.g. methylamino, ethylamino, propylamino, isopropylamino, butylamino, pentylamino, hexylamino, 2-cyanoethylamino or bis(2-cyanoethyl)amino.

$L^{11}$ and $A^5$ radicals are furthermore e.g. dimethylamino, diethylamino, dipropylamino, diisopropylamino, dibutylamino, dipentylamino, dihexylamino or N-methyl-N-ethylamino.

$L^{12}$ radicals are furthermore e.g. 2-methoxycarbonylethylthio or 2-ethoxycarbonylethylthio.

$R^1$, $R^2$, $R^{11}$, $R^{12}$ and $R^{13}$ radicals are furthermore e.g. cyclopentyl, cyclohexyl or cycloheptyl.

$L^9$ radicals are furthermore e.g. phenyl, 2-, 3- or 4-methylphenyl, 2,4-dimethylphenyl, 2-, 3- or 4-methoxyphenyl, 2-, 3- or 4-chlorophenyl, 2-, 3- or 4-methoxyphenyl, 2-, or 3-methylthienyl or 2-, 3- or 4-methylpyridyl.

$L^1$, $L^6$ and $L^7$ radicals are furthermore e.g. formyl, acetyl, propionyl, butyryl, pentanoyl or hexanoyl.

If $L^1$ or $L^7$ is the —CH=T radical where T is derived from a CH-acidic compound $H_2T$, suitable CH-acidic compounds $H_2T$ can be e.g. compounds of the formula

 (VIa)

 (VIb)

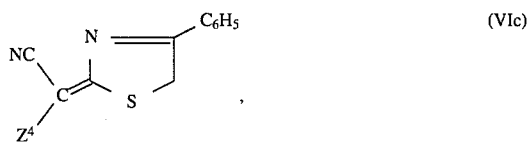 (VIc)

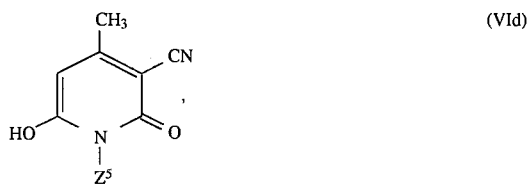 (VId)

 (VIe)

 (VIf)

or

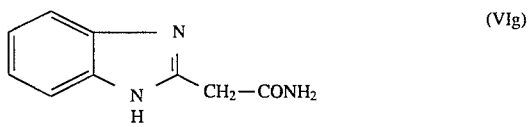 (VIg)

where $Z^1$ is cyano, nitro, $C_1$–$C_4$-alkanoyl, unsubstituted or substituted benzoyl, $C_1$–$C_4$-alkylsulfonyl, unsubstituted or substituted phenylsulfonyl, carboxyl, $C_1$–$C_4$-alkoxycarbonyl, $C_3$–$C_4$-alkenyloxycarbonyl, phenoxycarbonyl, carbamoyl, $C_1$–$C_4$-mono- or dialkylcarbamoyl, unsubstituted or substituted phenylcarbamoyl, unsubstituted or substituted phenyl, benzothiazol-2-yl, benzimidazol-2-yl, 5-phenyl-1,3,4-thiadiazol-2-yl or 2-hydroxyquinoxalin-3-yl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl, $C_3$–$C_4$-alkenyloxycarbonyl, phenylcarbamoyl or benzimidazol-2-yl, $Z^4$ is cyano, $C_1$–$C_4$-alkoxycarbonyl or $C_3$–$C_4$-alkenyloxycarbonyl, $Z^5$ is hydrogen or $C_1$–$C_6$-alkyl, $Z^6$ is hydrogen, $C_1$–$C_4$-alkyl or phenyl and $Z^7$ is $C_1$–$C_4$-alkyl.

In this case, the radical which is derived from compounds of the formula VIa, VIb or VIc where $Z^1$ is cyano, $C_1$–$C_4$-alkanoyl, $C_1$–$C_4$-alkoxycarbonyl or $C_3$–$C_4$-alkenyloxycarbonyl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl or $C_3$–$C_4$-alkenyloxycarbonyl and $Z^4$ is cyano is to be emphasized.

Particularly to be emphasized in this case is the radical which is derived from compounds of the formula VIa, VIb or VIc where $Z^1$ is cyano, $C_1$–$C_4$-alkoxycarbonyl or $C_1$–$C_4$-alkenyloxycarbonyl, $Z^2$ is $C_1$–$C_4$-alkoxy or $C_2$–$C_4$alkenyloxy, $Z^3$ is $C_1$–$C_4$-alkoxycarbonyl or $C_3$–$C_4$-alkenyloxycarbonyl and $Z^4$ is cyano.

$R^{10}$, $R^{11}$ and $R^{12}$ radicals are furthermore e.g. heptyl, octyl, 2-ethylhexyl, nonyl, decyl, undecyl, dodecyl, 4,7-dioxanonyl, 4,8-dioxadecyl, 4,6-dioxaundecyl, 3,6,9-trioxaundecyl, 4,7,10-trioxaundecyl or 4,7,10-trioxadodecyl.

$R^1$, $R^2$, $R^{10}$, $R^{11}$ and $R^{12}$ radicals are furthermore e.g. 2-methoxyethyl, 2-ethoxyethyl, 2-propoxyethyl, 2-butoxyethyl, 2-isobutoxyethyl, 2- or 3-methoxypropyl, 1-methoxyprop-2-yl, 2- or 3-ethoxypropyl or 2- or 3-propoxypropyl, 3,6-dioxaheptyl, 3,6-dioxaoctyl, 4,7-dioxaoctyl, 2-hydroxyethyl, 3-hydroxypropyl, 4-hydroxybutyl, 2-cyclohexyloxyethyl, 2- or 3-cyclohexyloxypropyl, 2- or 4-cyclohexyloxybutyl, 2-phenoxyethyl, 2-phenoxypropyl, 3-phenoxypropyl, 4-phenoxybutyl, 2-methoxycarbonylethyl, 2-ethoxycarbonylethyl, 2- or 3-methoxycarbonylpropyl, 2- or 3-ethoxycarbonylpropyl, 2- or 3-butoxycarbonylpropyl, 4-methoxycarbonylbutyl, 4-ethoxycarbonylbutyl, 2-cyanoethyl, 2- or 3-cyanopropyl, 4-cyanobutyl, 2-cyclohexylalkyl, 2- or 3-cyclohexylpropyl, benzyl, 1- or 2-phenylethyl, 2-acetoxyethyl, -propionyloxyethyl, 2- or 3-acetoxypropyl, prop-2-en-1-yl, 2-methylprop-2-en-1-yl, but-2-en-1-yl or but-3-en-1-yl.

If the $R^{11}$ and $R^{12}$ radicals, together with the nitrogen atom connecting them, are a five- or six-membered saturated heterocyclic radical which may contain further hetero atoms, suitable radicals therefor are e.g. pyrrolidinyl, piperidinyl, morpholinyl, thiomorpholinyl, thiomorpholinyl-S,S-dioxide, piperazinyl or N-($C_1$–$C_4$-alkyl)piperazinyl, such as N-methyl- or N-ethylpiperazinyl.

$R^{10}$, $R^{11}$ and $R^{12}$ radicals are furthermore e.g. formyl, acetyl, propionyl, butyryl, isobutyryl, pentanoyl, hexanoyl, heptanoyl, octanoyl, 2-ethylhexanoyl, benzoyl, 2-, 3- or 4-methylbenzoyl, 2-, 3- or 4-methoxybenzoyl or 2-, 3- or 4-chlorobenzoyl.

As explained above, the linkage to the radical Y can be effected, for example, by means of the carboxyl, hydroxy, mercapto, amino or $C_1$–$C_4$-monoalkylamino groups present in the azo dyes.

As already mentioned at the beginning, the dyes based on the radical Chr are known per se and described e.g. in Venkataraman (loc. cit.), in EP-A-201 896, EP-A- 535 590, EP-A-544 153, DE-A-3 108 077, U.S. Pat. No. 4,843,153 ot GB-A-1 546 803 or can be obtained by the methods mentioned there.

The novel azo dyes of the formula I can be prepared by methods known per se. This may be set out in the following, by way of example, for the case of a monoazo dye.

For example, a dye of the formula VIIa

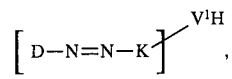  (VIIa)

where D is the radical of a diazo component, K is the radical of a coupling component and $V^1$ is oxygen, sulfur, imino or $C_1$–$C_4$-alkylimino, can first be reacted with a compound of the formula VIIIa or VIIIb Hal(—OC)$_q$—Y—Hal   (VIIIa)

HO—Y—Hal   (VIIIb), where Hal is chlorine or bromine and q is 0 or 1 and Y in each case has the abovementioned meaning. In the case of the compound VIIIa, the dye of the formula IXa

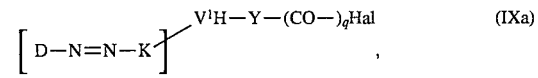   (IXa)

results where D, K, , $V^1$, Y, Hal and q in each case have the abovementioned meanings, which can then be reacted e.g., if q is 0, with a compound of the formula Xa W(—COOH)$_n$   (Xa), where n has the abovementioned meanings and W, with the exception of silicon, likewise has the abovementioned meanings, or if q is 1, with a compound of the formula Xb W(—OH)$_n$   (Xb), where n has the abovementioned meanings and W, with the exception of silicon, likewise has the abovementioned meanings.

(As already explained above, the compounds of the formula Xa in which n is 3 to 6 can also be used in the form of their anhydrides.)

If W is silicon, silicon tetrachloride, e.g., can be reacted with the dye of the formula IXb

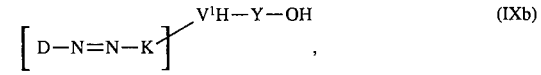   (IXb)

where D, K, $V^1$ and Y in each case have the abovementioned meanings, resulting from the reaction of the dye VIIa with the compound VIIIb.

It is furthermore also possible to react a dye of the formula VIIb

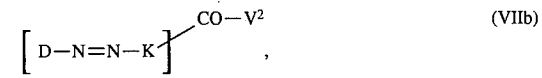   (VIIb)

where $V^2$ is hydroxyl, chlorine or bromine and D and K in each case have the abovementioned meanings, first with a compound of the formula VIIIc $V^3$—Y—OH   (VIIIc), where Y has the abovementioned meaning and $V^3$ is hydroxyl or the radical Hal(—OC)$_q$, where Hal and q in each case have the abovementioned meanings, to give the dye of the formula IXb

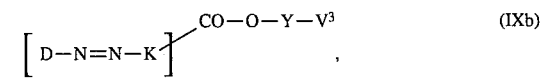   (IXb)

where D, K, Y and $V^3$ in each case have the abovementioned meanings, and then to react this dye, as described above, either with the compounds of the formula Xa or Xb or with silicon tetrachloride.

If the dye radical Chr is linked to the radical Y via a chemical bond, monoazo dyes, for example, of the formula VIIc or VIId $$\left[ D-N=N-K \right] \overset{Y-(CO)_{\overline{q}} Hal}{\diagup} \quad \text{(VIIc)}$$

$$\left[ D-N=N-K \right] \overset{Y-OH}{\diagup} \quad \text{(VIId)}$$

where D, K, Y, Hal and q in each case have the abovementioned meanings, can be used as starting materials and the abovementioned subsequent reactions carried out.

The novel dyes of the formula I have a good solubility in organic solvents. They furthermore solidify as glasses and form isotropic amorphous layers.

They are advantageously suitable e.g. for use in nonlinear optical systems (see, for example, Chemistry and Industry, 1st October 1990, pages 600 to 608).

In particular, the suitability of the dyes in communications technology, in electrooptical modulators, e.g. Mach-Zehnder interferometers), in optical switches, for frequency mixing or in waveguides.

The novel azo dyes of the formula I are furthermore advantageously suitable e.g. for dyeing or printing textile materials. These are, for example, fibers or fabric, in particular made of polyesters, and in addition also made of cellulose esters or polyamides, or blended fabric made of polyesters and cellulose fibers or wool.

In addition, the novel azo dyes of the formula I are advantageously suitable for dyeing polymers in bulk, for use in electrophotography or as dyes for electrostatic toners.

The following examples are intended to illustrate the invention in greater detail.

EXAMPLE 1

118.8 g (0.33 mol) of the dye of the formula $$Cl-OC-C_2H_4-N(C_2H_5)-\text{C}_6\text{H}_4-N=N-\text{C}_6\text{H}_4-NO_2$$

were dissolved in 500 ml of a mixture of toluene and pyridine (3:1 v/v) and added dropwise to 19.6 g (0.1 mol) of the compound of the formula $$CH_3OOC-\text{C}_6\text{H}_2(OH)_3$$

in 200 ml of boiling toluene. The reaction mixture was heated under reflux for a further 6 h and, after cooling, poured onto 500 ml of ice-water/hydrochloric acid. The organic phase was separated off, extracted by shaking with aqueous sodium hydrogen carbonate solution, dried over sodium sulfate and freed from the solvent. The residue was recrystallized from ethanol/toluene.

87.6 g (25% of theory) of the dye of the formula $$CH_3OOC-\text{C}_6\text{H}_2(O-)_2-O-\left[-OC-C_2H_4-N(C_2H_5)-\text{C}_6\text{H}_4-N=N-\text{C}_6\text{H}_4-NO_2\right]_3$$

$\lambda_{max}$ (CH$_2$Cl$_2$): 463 nm; Tg: 149° C.

were obtained.

EXAMPLE 2

69.1 g (0.22 mol) of the dye of the formula $$HO-C_2H_4-N(C_2H_5)-\text{C}_6\text{H}_4-N=N-\text{C}_6\text{H}_4-NO_2$$

dissolved in 100 ml of dichloromethane, were added dropwise to a solution of 21.8 g (0.1 mol) of benzene-1,2,4,5-tetracarboxylic dianhydride in 250 ml of dichloromethane, and the mixture was heated under reflux for 4 h. 12.75 g (0.22 mol) of allyl alcohol, 44.9 g (0.22 mol) of dicyclohexylcarbodiimide and 2.96 g (0.02 mol) of 4-pyrrolidinopyridine were then added and the mixture was stirred at room temperature for 8 h. The precipitate formed was then filtered off and the filtrate was concentrated. The resulting residue was purified by column chromatography (silica gel—toluene/glacial acetic acid 4:1 v/v).

19.45 g (21% of theory) were obtained of an isomer mixture of the dye of the formula $$Q^1-OC-\text{C}_6\text{H}_2-(CO-Q^1)(CO-Q^2)-OC-Q^2$$

where in each case one of the two radicals $Q^1$ and $Q^2$ is a radical of the formula $$O-C_2H_4-N(C_2H_5)-\text{C}_6\text{H}_4-N=N-\text{C}_6\text{H}_4-NO_2$$

$\lambda_{max}$ (CH$_2$Cl$_2$): 446 nm and the other is a radical of the formula OCH$_2$CH=CH$_2$.

EXAMPLE 3

152.25 g (0.44 mol) of the dye of the formula $$HO-(CH_2)_6-N(C_2H_5)-\text{C}_6\text{H}_4-N=N-\text{C}_6\text{H}_4-NO_2$$

dissolved in 350 ml of pyridine, were added dropwise at 0° C. to a solution of 16.9 g (0.1 mol) of silicon tetrachloride in 200 ml of pyridine. The mixture was stirred at room temperature for 6 h and then worked up by a method similar to Example 1. 101 g (18% of theory) of the dye of the formula

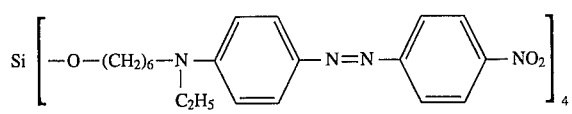

$\lambda_{max}$ (CH$_2$Cl$_2$): 482 nm were obtained.

EXAMPLE 4

26.7 g (0.1 mol) of benzene-1,3,5-tricarbonyl chloride were introduced into 200 ml of toluene and heated to boiling. 100.5 g (0.32 mol) of the dye of the formula

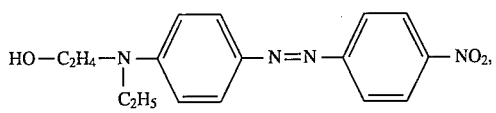

dissolved in 400 ml of a mixture of toluene/pyridine (3:1 v/v), were added dropwise to this mixture. It was then heated under reflux for 6 h and then worked up by a method similar to Example 1. 58.35 g (53% of theory) of the dye of the formula

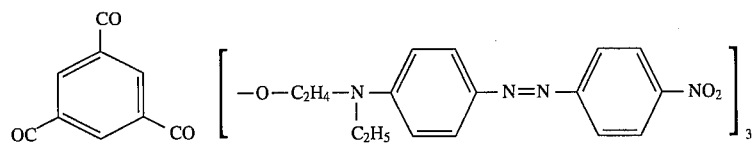

$\lambda_{max}$ (CH$_2$Cl$_2$): 452 nm were obtained.

We claim:

1. A process for nonlinearly varying optical radiation which comprises the step of interacting the optical radiation with an azo dye of the Formula I and recovering the nonlinearly varied optical radiation:

$$W(-X-Y-Chr)_n \qquad (I),$$

where n is 2 to 6,

Y is C$_1$–C$_6$-alkylene,

Chr is a radical which is derived from a mono- or poly-azo dye and which is bonded to the radical Y via a chemical bond, CO—O, oxygen, sulfur, imino or C$_1$–C$_4$-alkylimino, X is a radical of the formula CO—O or O—CO and W is an n-valent radical which is derived from an unsubstituted or substituted C$_2$–C$_{20}$-alkane, an unsubstituted or substituted C$_4$–C$_7$-cycloalkane, an unsubstituted or substituted benzene or an unsubstituted or substituted naphthalene, or, if n is 4, is also silicon.

2. A process for modulating optical radiation which comprises interacting the optical radiation with an azo dye of the Formula I and recovering the modulated optical radiation:

$$W(-X-Y-Chr)_n \qquad (I),$$

where n is 2 to 6,

Y is C$_1$–C$_6$-alkylene,

Chr is a radical which is derived from a mono- or poly-axo dye and which is bonded to the radical Y via a chemical bond, CO—O, oxygen, sulfur, imino or C$_1$–C$_4$-alkylimino.

X is a radical of the formula CO—O or O—CO and

W is an n-valent radical which is derived from an unsubstituted or substituted C$_2$–C$_{20}$-alkane, an unsubstituted or substituted C$_4$–C$_7$-cycloalkane, an unsubstituted or substituted benzene or an unsubstituted or substituted naphthalenes, or, if n is 4, is also silicon.

3. A nonlinear optical device comprising as an active nonlinear element an azo dye of the formula I:

$$W(-X-Y-Chr)_n \qquad (I),$$

where n is 2 to 6,

Y is C$_1$–C$_6$-alkylene,

Chr is a radical which is derived from a mono- or poly-axo dye and which is bonded to the radical Y via a chemical bond, CO—O, oxygen, sulfur, imino or C$_1$–C$_4$-alkylimino, X is a radical of the formula CO—O or O—CO and W is an n-valent radical which is derived from an unsubstituted or substituted C$_2$–C$_{20}$-alkane, an unsubstituted or substituted C$_4$–C$_7$-cycloalkane, an unsubstituted or substituted benzene or an unsubstituted or substituted naphthalene, or, if n is 4, is also silicon.

* * * * *